Patented July 12, 1932

1,866,568

UNITED STATES PATENT OFFICE

ALEXANDER IZSAK, OF CENTRAL PARK, NEW JERSEY, AND FRANK A. McDERMOTT, OF CLAYMONT, DELAWARE, ASSIGNORS, BY MESNE ASSIGNMENTS, TO E. I. DU PONT DE NEMOURS AND COMPANY, OF WILMINGTON, DELAWARE, A CORPORATION OF DELAWARE

PROCESS OF PRODUCING ETHYL ACETATE, ETHYL ALCOHOL AND OTHER PRODUCTS BY FERMENTATION

No Drawing.     Application filed November 8, 1927.  Serial No. 231,990.

This invention relates to the production of ethyl acetate, ethyl alcohol and other products including certain higher alcohols by fermentation.

It is a well known fact that many species of so-called "wild" yeasts, especially those of the film-forming type, aside from ordinary ethyl alcohol, also produce fruity odors during fermentation, which by the faculty of smell suggest esters of the lower fatty acids and aliphatic alcohols. Typical of such wild yeasts are the species designated as *Willia anomala*, *Mycoderma vini*, *Mycoderma lactis*, etc. These are frequently grouped under the general description of "film" or "surface", "Kahm" and "ester"-yeasts.

To those skilled in the art it is known that all the above described "film" yeasts have but relatively meager growth with a subsequent slow fermentation in any concentration of sugar solution, whether it be saccharified grain or molasses as the source.

An object of this invention is the production of ethyl acetate, ethyl alcohol, and other products from fermentable sugars. A further object of our invention is to provide a process whereby a much greater yield of fusel oil and glycerol is obtained. Other objects will appear hereinafter.

We have found by laboratory and plant tests that by treating blackstrap molasses, or beet molasses, or saccharified grain mash, with distillery refuse slop, lively fermentation will be set up immediately upon inoculation with a pure culture of any of the herein mentioned yeasts. The reason for this perhaps lies in the fact that the distillery slop furnishes enough buffering materials such as amino-acids, lactic-acid, acetic acid, etc., without which there is no such active fermentation. The amino-acids serve as yeast foods, with the simultaneous production of fusel oil.

It is a well known fact in fermentology that the action of all microbes is a specific one. This notion of specificity has a most important consequence in practice as well as in theory. It shows the necessity of employing one and a single organism for the use of a definite end. The *Saccharomyces cerevisiæ* type yeasts are not able to utilize as sources of nitrogen, products that are not diffusible— i. e., which cannot pass through the cell wall into the interior of the cells—as its proteoclastic enzymes are endo-enzymes, and are not excreted into the medium in which the yeast is growing. For this reason, the production of fusel oil, during their fermentation cannot exceed that theoretically derivable from the amino-acids and lower polypeptides already present in the mash. Other types of yeasts, however, are known which excrete their proteoclastic enzymes into the medium in which they are growing, and hence cannot be conveniently cultured on gelatin media owing to the fact that they digest and liquefy this medium. Among these yeasts is that known as *Willia anomala*. This type of film yeast is frequently met with as contaminations in fermentations not conducted under pure culture methods. This micro-organism is a long-celled yeast, which forms a dry, white, wrinkled film on the surface of the sugar solutions, and other appropriate media, produces an active fermentation in its pure culture, accompanied by a fruity odor suggesting ethyl acetate. If the fermented liquid is allowed to stand long enough with access of air, it may completely oxidize the products of fermentation, leaving the solution "flat" and musty. It liquefies gelatin media slowly, but does not attack agar. It does not grow in alkali media. It is strongly aerobic by preference, but strong aeration of a fermenting culture reduces, and may entirely eliminate the amount of ester in the fermented liquid. It will also be observed that considerable quantities of fusel oil, glycerol, and acetic acid are also formed as by-products of the fermentation.

We have found that this yeast, or the others mentioned above, may be grown with very good results in acid medium such as a solution of blackstrap molasses or beet molasses in almost any dilution with water, the limiting factor being only that with a very concentrated solution the fermentation is retarded, while with a more dilute solution the fermentation is accelerated, the optimum range being somewhere from 15° to 25° Brix solution. We have further found that by an addition of from 10% to 50% of distillery waste slop, the fermentation is considerably accelerated thereby producing much higher yields. We have further found that by reason of the fact that ethyl acetate is very volatile at atmospheric pressures and temperatures it is necessary to scrub the fermentation gases evolved during the process of fermentation in a suitable medium such as cresol or liquid petrolatum, U. S. P., etc., and in this manner secure the full value of our efforts.

The following example is given, but it is to be understood that this is only for illustrative purpose, and is not to be taken in any way as limiting the invention disclosed herein:

1,000 grams of distillery waste slop, and 2,000 grams of cane molasses containing about 50% of total sugars after inversion with acid which reduce Fehling's solution and calculated as invert sugar, are dissolved in 10 liters of water, divided into two equal portions, and sterilized at 5 to 8 lbs. steam pressure in appropriate containers. Each is then inoculated with about 100 c. c. of an active culture of *Willia anomala* in a portion of the same solution. One half of the mixture (A) is allowed to ferment without further modification while the other half (B) is aerated by a slow current of air—about 5 bubbles per second—injected through a tube at bottom of the container. (A) will require 7 or 8 days to complete fermentation, while (B) will be completely fermented in about 4 days. On analysis of the two mashes at the end of fermentation, the following products will be found in approximately the yields indicated, the figures being percents of the total reducing sugar (as invert) initially present in the mashes:

| | (A) Non-aerated | (B) Aerated |
|---|---|---|
| Ethyl alcohol | 38. to 40. | 35. to 36. |
| Ethyl acetate | 2. to 4. | None |
| Fusel oil | 0.5 | 0.8 |
| Glycerol | 6. to 7. | Not determined |
| Acetic acid | 3. | Not determined |
| Residual reducing substances calculated as invert sugar | 8.0 | 7.5 |
| Acetaldehyde | None observed | Trace |

It is obvious from the above figures that for the production of ethyl acetate, air should not be passed through the fermenting medium.

According to the end products desired, or for other good reasons the fermentation may be modified in various ways; for instance, (1) a slow air current may be directed over the surface of the fermenting mash, to remove $CO_2$ as fast as released, resulting in a more rapid fermentation; (2) ammonium salts, phosphates or sulphates, or still other stimulants may be added to hasten the growth of the yeast cells; (3) progressive neutralization of the acidity produced may be secured by suspending, e. g. calcium carbonate in the mash, resulting in an increased production of organic acids; (4) the initial mash may be made up at a very low sugar concentration, and fresh, sterile concentrated mash added either in small portions at intervals or in a continuous stream.

We have also found that by acidification of the beer, for example, with sulfuric acid, before distillation, an apparent increase in the yield of the ester may be obtained.

As many apparently widely different embodiments of this invention may be made without departing from the spirit thereof, it is to be understood that we do not intend to be limited by our invention to the specific embodiments thereof except as indicated in the appended claims.

We claim:

1. The process of producing ethyl acetate and ethyl alcohol by fermentation with yeast fungi that excrete their proteoclastic enzymes into an acid fermentable sugar medium which comprises inoculating the medium with fungi of the type of *Willia anomala*, *Mycoderma vini*, and *Mycoderma lactis* controlling the optimum conditions and causing the fermentation of the medium.

2. The process of producinug ethyl acetate and ethyl alcohol with yeast fungi that excrete their proteoclastic enzymes into a sterilized acid fermentable sugar medium which comprises inoculating the medium with fungi of the type of *Willia anomala*, *Mycoderma vini*, and *Mycoderma lactis*, causing the medium to ferment and further acidifying the medium to increase the yield of esters and ethyl alcohol.

3. The process of producing ethyl acetate and ethyl alcohol with yeast fungi that excrete their proteoclastic enzymes into a sterilized acid fermentable sugar medium, to which distillery slop has been added, which comprises inoculating the medium with fungi of the type of *Willia anomala*, *Mycoderma vini*, and *Mycoderma lactis*, and causing the medium to ferment.

4. In the process of producing ethyl acetate and ethyl alcohol, the step which comprises causing the fermentation of a sterilized acid fermentable sugar medium with the addition of distillery slop, with the herein-described "wild yeasts" of the type of *Willia anomala*, *Mycoderma vini*, and *Mycoderma lactis*.

5. The process of producing ethyl acetate and ethyl alcohol, which comprises causing the fermentation of a sterilized acid fermentable sugar medium with the addition of distillery slop, with the herein-described "wild yeasts", of the type of *Willia anomala*, *Mycoderma vini*, and *Mycoderma lactis*, and acidifying the medium to increase the yield of esters.

6. In the process of producing ethyl acetate and ethyl alcohol the steps which comprise sterilizing a fermentable sugar medium, adding distillery slop to the medium, and inoculating the medium with the herein-described "wild yeasts" of a type of *Willia anomala*, *Mycoderma vini*, and *Mycoderma lactis*.

7. In the process of producing ethyl acetate and ethyl alcohol the steps which comprise sterilizing a fermentable sugar medium, acidifying the medium, adding to the medium distillery slop, and inoculating the medium with the herein-described "wild yeasts" of a type of *Willia anomala*, *Mycoderma vini*, and *Mycoderma lactis*.

In testimony whereof we affix our signatures.

ALEXANDER IZSAK.
FRANK A. McDERMOTT.